(12) United States Patent
Ahn et al.

(10) Patent No.: US 9,034,963 B2
(45) Date of Patent: May 19, 2015

(54) TRANSPARENT THERMOPLASTIC RESIN COMPOSITION HAVING IMPROVED WHITENING RESISTANCE AT LOW TEMPERATURE AND EXCELLENT IMPACT STRENGTH

(71) Applicant: Cheil Industries Inc., Gumi-si (KR)

(72) Inventors: Jun Hwan Ahn, Uiwang-si (KR); Il Jin Kim, Uiwang-si (KR); Sun Hong Min, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 14/308,822

(22) Filed: Jun. 19, 2014

(65) Prior Publication Data
US 2015/0005425 A1    Jan. 1, 2015

(30) Foreign Application Priority Data

Jun. 28, 2013 (KR) .................. 10-2013-0076083
Jun. 18, 2014 (KR) .................. 10-2014-0074042

(51) Int. Cl.
*C08L 51/04* (2006.01)
*C08L 33/12* (2006.01)

(52) U.S. Cl.
CPC .............. *C08L 51/04* (2013.01); *C08L 33/12* (2013.01); *C08L 2201/10* (2013.01)

(58) Field of Classification Search
USPC .............. 524/269; 525/72, 81, 84, 83, 80
See application file for complete search history.

(56) References Cited

U.S. PATENT DOCUMENTS

| | | | | |
|---|---|---|---|---|
| 5,283,286 A * | 2/1994 | Takahashi et al. | ............... | 525/75 |
| 5,362,795 A * | 11/1994 | Matsumoto et al. | .......... | 524/501 |
| 5,658,985 A * | 8/1997 | Eichenauer et al. | ............ | 525/83 |
| 5,891,962 A | 4/1999 | Otsuzuki et al. | | |
| 6,489,379 B1 * | 12/2002 | Eichenauer | .................... | 523/201 |
| 6,593,404 B1 * | 7/2003 | Shin et al. | ...................... | 524/140 |
| 7,186,778 B2 * | 3/2007 | Eichenauer | ..................... | 525/66 |
| 2014/0186612 A1 * | 7/2014 | Kwon et al. | .................. | 428/327 |

FOREIGN PATENT DOCUMENTS

EP       0703252 A2    3/1996

* cited by examiner

*Primary Examiner* — Margaret Moore
(74) *Attorney, Agent, or Firm* — Additon, Higgins & Pendleton, P.A.

(57) ABSTRACT

A transparent thermoplastic resin composition includes (A) a rubber-modified graft copolymer which is prepared by copolymerizing (a2) a (meth)acrylic acid alkyl ester monomer, (a3) a styrene-based monomer and (a4) an acrylonitrile-based monomer onto (a1) a butadiene-based rubber polymer; (B) a styrene-based copolymer having a glass transition temperature of about 90 to about 100° C. which is prepared by copolymerizing (b1) a methacrylic acid alkyl ester monomer, (b2) an acrylic acid alkyl ester monomer, (b3) a styrene-based monomer and (b4) an acrylonitrile-based monomer; and (C) a silicone oil. The composition can have improved whitening resistance at low temperatures and/or excellent impact strength.

17 Claims, No Drawings

TRANSPARENT THERMOPLASTIC RESIN COMPOSITION HAVING IMPROVED WHITENING RESISTANCE AT LOW TEMPERATURE AND EXCELLENT IMPACT STRENGTH

CROSS-REFERENCE TO RELATED APPLICATION

This application claims priority under 35 USC Section 119 to and the benefit of Korean Patent Application Nos. 10-2013-0076083, filed Jun. 28, 2013, and 10-2014-0074042, filed Jun. 18, 2014, the entire disclosure of which is incorporated herein by reference.

FIELD OF THE INVENTION

The present invention relates to a transparent thermoplastic resin composition.

BACKGROUND

Conventional acrylonitrile-butadiene-styrene copolymer resin (ABS resin) is used in various applications such as automobile parts, home appliances, toys, and the like because of the hardness and chemical resistance of acrylonitrile, impact strength of butadiene and processibility of styrene, and beautiful appearance. Conventional ABS resin, however, cannot typically be used in application requiring transparency because the ABS resin is opaque. Accordingly, there is a need for a transparent resin.

Examples of transparent resins used in products that require transparency can include styrene-acrylonitrile copolymer resin (SAN resin), polycarbonate resin (PC resin), general-purpose polystyrene resin (GPPS resin), poly(methyl methacrylate) resin (PMMA resin), transparent acrylonitrile-butadiene-styrene copolymer resin (transparent ABS resin) and the like. Transparency can be imparted to ABS resin by minimizing light scattering and refraction at the interface of the dispersed-phase and continuous-phase by matching the refractive index of the dispersed-phase rubber-modified polymer with the refractive index of the continuous-phase SAN resin matrix. Also, transparent ABS resin can have high impact strength and excellent processibility compared with other transparent resins.

European Patent No. 0703252 is directed to a method for imparting transparency to high-impact polystyrene resin. The resin, however, can have deteriorated chemical resistance and scratch resistance.

Although there have been efforts to develop a transparent ABS resin having relatively high chemical resistance and scratch resistance, most of these resins attain just 2B or 3B pencil hardness.

SUMMARY

The present inventors have developed a transparent thermoplastic resin composition that can have improved whitening resistance at low temperatures by using in exemplary embodiments a methyl methacrylate-styrene-acrylonitrile (MSAN) copolymer having a low glass transition temperature instead of a styrene-acrylonitrile (SAN) copolymer and that can have excellent impact strength by using silicone oil.

Exemplary embodiments of the present invention can provide a transparent thermoplastic resin composition that can have improved whitening resistance at low temperatures. Exemplary embodiments of the present invention can also provide a transparent thermoplastic resin composition that can have excellent transparency. Still further, exemplary embodiments of the present invention can provide a transparent thermoplastic resin composition that can have excellent impact strength.

A transparent thermoplastic resin composition can comprise (A) a rubber-modified graft copolymer which is prepared by graft copolymerizing (a2) a (meth)acrylic acid alkyl ester monomer, (a3) a styrene-based monomer and (a4) an acrylonitrile-based monomer onto (a1) a butadiene-based rubber polymer, (B) a styrene-based copolymer having glass transition temperature of about 90° C. to about 100° C. which is prepared by copolymerizing (b1) a methacrylic acid alkyl ester monomer, (b2) an acrylic acid alkyl ester monomer, (b3) a styrene-based monomer and (b4) an acrylonitrile-based monomer, and (C) a silicone oil.

The difference between the refractive index of the rubber-modified graft copolymer (A) and the refractive index of the butadiene-based rubber polymer (a1) may be about 0.005 or less, and the difference between the refractive index of the rubber-modified graft copolymer (A) and the refractive index of the styrene copolymer (B) may be about 0.005 or less.

The transparent thermoplastic resin composition can comprise about 5 to about 75% by weight of the rubber-modified graft copolymer (A), about 25 to about 95% by weight of the styrene-based copolymer (B), and about 0.01 to about 0.1 parts by weight of the silicone oil (C) based on about 100 parts by weight of the rubber-modified graft copolymer (A) and the styrene-based copolymer (B).

The rubber-modified graft copolymer (A) can be prepared by graft copolymerizing the (meth)acrylic acid alkyl ester monomer (a2), the styrene-based monomer (a3) and the acrylonitrile-based monomer (a4) onto the butadiene-based rubber polymer (a1).

The rubber-modified graft copolymer (A) may comprise about 20 to about 60% by weight of the butadiene-based rubber polymer (a1), about 20 to about 60% by weight of the (meth)acrylic acid alkyl ester monomer (a2), about 10 to about 40% by weight of the styrene-based monomer (a3) and about 1 to about 20% by weight of the acrylonitrile-based monomer (a4).

The styrene-based copolymer (B) may comprise about 40 to about 80% by weight of the methacrylic acid alkyl ester monomer (b1), about 5 to about 50% by weight of the acrylic acid alkyl ester monomer (b2), about 1 to about 30% by weight of the styrene-based monomer (b3), and about 1 to about 20% by weight of the acrylonitrile-based monomer (b4).

The transparent thermoplastic resin composition can further comprise methyl methacrylate-styrene-acrylonitrile (MSAN) copolymer.

The butadiene-based rubber polymer (a1) may be polybutadiene polymer, styrene-butadiene copolymer or a combination thereof. The butadiene-based rubber polymer (a1) may have an average particle diameter of about 0.05 to about 0.4 μm, about 60 to about 95% by weight of gel content, and a swelling index of about 10 to about 30.

The (meth)acrylic acid alkyl ester monomer (a2) may have 2 to 20 carbon atoms, the methacrylic acid alkyl ester monomer (b1) may have 2 to 20 carbon atoms, and the acrylic acid alkyl ester monomer (b2) may have 2 to 20 carbon atoms.

The styrene-based monomer may be styrene, α-ethyl styrene, α-methyl styrene, p-methyl styrene, o-t-butyl styrene, bromo styrene, chloro styrene, trichloro styrene or a combination thereof.

The acrylonitrile-based monomer may be acrylonitrile, methacrylonitrile, fumaronitrile or a combination thereof.

The styrene-based copolymer (B) may have weight average molecular weight of about 100,000 to about 130,000 g/mol.

The transparent thermoplastic resin composition can further comprise polymerization initiators, catalysts for initiation, emulsifying agents, molecular weight control agents, heat stabilizers, release agents, dispersants, anti-dripping agents, UV stabilizers, inorganic fillers, inorganic fibers or a combination thereof.

A molded article can be prepared from the transparent thermoplastic resin composition that can have improved whitening resistance at low temperature.

The molded article can have an Izod impact strength (unnotched) of about 8 to about 20 kgf·cm/cm which is measured for ⅛ inch thickness in accordance with ASTM D256.

The molded article can have a haze value of about 1.5 to about 4.0% which is measured for 3.2 mm thickness in accordance with ASTM D1003.

The present invention can provide a transparent thermoplastic resin composition that can have improved whitening resistance at low temperatures, excellent transparency, and/or excellent impact strength.

DETAILED DESCRIPTION

The present invention now will be described more fully hereinafter in the following detailed description of the invention in which some but not all embodiments of the invention are described. Indeed, this invention may be embodied in many different forms and should not be construed as limited to the embodiments set forth herein; rather, these embodiments are provided so that this disclosure will satisfy applicable legal requirements.

Exemplary embodiments of the present invention relate to a transparent thermoplastic resin composition that can have improved whitening resistance at low temperatures and/or excellent impact strength.

Exemplary embodiments of the transparent thermoplastic resin composition in accordance with the present invention may comprise (A) a rubber modified graft copolymer prepared by graft copolymerizing (a2) a (meth)acrylic acid alkyl ester monomer, (a3) a styrene-based monomer and (a4) an acrylonitrile-based monomer onto (a1) a butadiene-based rubber polymer; (B) a styrene-based copolymer having glass transition temperature of about 90 to about 100° C., which is prepared by copolymerizing (b1) a methacrylic acid alkyl ester monomer, (b2) an acrylic acid alkyl ester monomer, (b3) a styrene-based monomer and (b4) an acrylonitrile-based monomer; and (C) a silicone oil.

The transparent thermoplastic resin composition of the present invention may comprise about 5 to about 75% by weight of the rubber-modified graft copolymer (A), about 25 to about 95% by weight of the styrene-based copolymer (B), and about 0.01 to about 0.1 parts by weight of the silicone oil (C) based on about 100 parts by weight of the rubber-modified graft copolymer (A) and the styrene-based copolymer (B).

(A) Rubber-Modified Graft Copolymer

A rubber-modified graft copolymer (A) of the present invention may be prepared by graft copolymerizing a (meth)acrylic acid alkyl ester monomer (a2), a styrene-based monomer (a3) and an acrylonitrile-based monomer (a4) onto a butadiene-based rubber polymer (a1). In exemplary embodiments, the rubber-modified graft copolymer (A) may be prepared with a grafting percentage of about 55 to about 80%. If the grafting percentage is less than about 55%, when polymerizing, rubber polymer particles can collide and aggregate, which can result in deterioration of transparency. If the grafting percentage is more than about 80%, impact resistant efficiency may not be improved, which can be unfavorable for commercial production. Within the above range of grafting percent, dispersion efficiency of rubber polymer particles may be maximized, and excellent impact strength can be achieved though the rubber polymer is used in a low amount for improving transparency.

Refractive indexes of the (meth)acrylic acid alkyl ester monomer (a2), the styrene-based monomer (a3) and the acrylonitrile-based monomer (a4), which are used for preparing the rubber-modified graft copolymer (A), contribute to transparency. These refractive indexes can be controlled by controlling the amount of monomers used and the mixture ratio of the monomers. That is, for transparency, the refractive index of the butadiene-based rubber polymer (a1) used for preparing the rubber-modified graft copolymer (A) should be similar to the refractive index of the rubber-modified graft copolymer (A).

As a non-limiting example, after polymerizing, refractive indexes of each components used for preparing the rubber-modified graft copolymer (A) may be as follows. The polybutadiene rubber polymer may have a refractive index of about 1.518, the methyl methacrylate may have a refractive index of about 1.489, the styrene may have a refractive index of about 1.592, and the acrylonitrile may have a refractive index of about 1.520. In exemplary embodiments, the difference between the refractive index of the rubber-modified graft copolymer (A) and the refractive index of the butadiene-based rubber polymer (a1) is about 0.005 or less.

The rubber-modified graft copolymer (A) may comprise about 20 to about 60% by weight of the butadiene-based rubber polymer (a1), about 20 to about 60% by weight of the (meth)acrylic acid alkyl ester monomer (a2), about 10 to about 40% by weight of the styrene-based monomer (a3) and about 1 to about 20% by weight of the acrylonitrile-based monomer (a4).

In some embodiments, the rubber-modified graft copolymer (A) may include the butadiene-based rubber polymer (a1) in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60% by weight. Further, according to some embodiments of the present invention, the butadiene-based rubber polymer (a1) may be present in an amount of from about any of the foregoing amounts to about any other of the foregoing amounts.

In some embodiments, the rubber-modified graft copolymer (A) may include the (meth)acrylic acid alkyl ester monomer (a2) in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60% by weight. Further, according to some embodiments of the present invention, the (meth)acrylic acid alkyl ester monomer (a2) may be present in an amount of from about any of the foregoing amounts to about any other of the foregoing amounts.

In some embodiments, the rubber-modified graft copolymer (A) may include the styrene-based monomer (a3) in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40% by weight. Further, according to some embodiments of the present invention, the styrene-based monomer (a3) may be present in an amount of from about any of the foregoing amounts to about any other of the foregoing amounts.

In some embodiments, the rubber-modified graft copolymer (A) may include the acrylonitrile-based monomer (a4) in an amount of about 1, 2, 3, 4, 5, 6, 7, 8, 9, 10, 11, 12, 13, 14, 15, 16, 17, 18, 19, or 20% by weight. Further, according to some embodiments of the present invention, the acrylonitrile-based monomer (a4) may be present in an amount of from about any of the foregoing amounts to about any other of the foregoing amounts.

When the rubber-modified graft copolymer (A) comprises less than about 20% by weight of the butadiene-based rubber polymer (a1), impact strength of the resin composition can be deteriorated. When the rubber-modified graft copolymer (A) comprises more than about 60% by weight of the butadiene-based rubber polymer (a1), whitening resistance at low temperatures can be improved; however, a lot of coagulation can be formed due to instability of polymerization, gloss of resin composition can be deteriorated because the graft layer may not be formed sufficiently, and also poor drying can occur because of coarse particle formation during solidification.

Also, when the (meth)acrylic acid alkyl ester monomer (a2) and the styrene-based monomer (a3) are used in amounts within the above ranges, the refractive index of the rubber-modified graft copolymer (A) may approximately be the same as the refractive index of the butadiene-based rubber polymer (a1), so that the resin composition may have excellent transparency. Also when the acrylonitrile monomer (a4) is used in an amount within the above range, the resin composition may have excellent impact strength, and yellowing of an article prepared using the resin composition can be minimized or prevented.

Examples of the butadiene-based rubber polymer (a1) may include without limitation polybutadiene polymer, styrene-butadiene copolymer, and the like, and combinations thereof. In exemplary embodiments, polybutadiene polymer can be used.

The butadiene-based rubber polymer (a1) can have an average particle diameter of about 0.05 to about 0.4 μm. When the average particle diameter of the butadiene-based rubber polymer (a1) is less than about 0.05 μm, impact strength of the resin composition can be deteriorated due to reduced impact absorption property of the rubber polymer. If the average particle diameter of the butadiene rubber polymer is more than about 0.4 μm, impact strength of the resin composition can be improved; however, transparency of the resin composition can be deteriorated because light transmittancy can be reduced due to inclusion of particles having a similar size within the visible light wavelength.

In addition, the butadiene-based rubber polymer (a1) may comprise about 60 to about 95% by weight of gel content, and can have a swelling index of about 10 to about 30. If gel content and swelling index are within the above ranges, the resin composition may have excellent transparency.

As the (meth)acrylic acid alkyl ester monomer (a2), (meth) acrylic acid alkyl ester having 2 to 20 carbon atoms may be used. Examples of the (meth)acrylic acid alkyl ester monomer (a2) may include without limitation methyl(meth)acrylate, ethyl(meth)acrylate, propyl(meth)acrylate, butyl(meth) acrylate, (meth)acrylic acid 2-ethylhexyl ester, (meth)acrylic acid decyl ester, (meth)acrylic acid lauryl ester, and the like and combinations thereof. In exemplary embodiments, methyl methacrylate can be used. Examples of the styrene-based monomer (a3) can include without limitation styrene, α-ethyl styrene, α-methyl styrene, p-methyl styrene, o-t-butyl styrene, bromo styrene, chloro styrene, trichloro styrene, and the like, and combinations thereof. In exemplary embodiments, styrene can be used.

Examples of the acrylonitrile-based monomer (a4) can include without limitation acrylonitrile, methacrylonitrile, fumaronitrile, and the like, and combinations thereof. In exemplary embodiments, acrylonitrile can be used.

The rubber-modified graft copolymer (A) may be included in an amount of about 5 to about 75% by weight based on 100% by weight of the rubber-modified graft copolymer (A) and the styrene-based copolymer (B). In some embodiments, the rubber-modified graft copolymer (A) may be included in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, or 75% by weight. Further, according to some embodiments of the present invention, the rubber-modified graft copolymer (A) may be present in an amount of from about any of the foregoing amounts to about any other of the foregoing amounts.

The rubber-modified graft copolymer (A) may be prepared by following steps. First, the butadiene-based rubber polymer (a1) can be prepared by emulsion polymerization, and then the butadiene-based rubber polymer (a1) and a polymerization initiator/catalyst mixture can be inputted or directed into a reactor. Next, the (meth)acrylic acid alkyl ester monomer (a2), the styrene-based monomer (a3), the acrylonitrile-based monomer (a4) and optionally a molecular weight control agent can be mixed, the mixture can be stirred for about 5 to 10 about minutes, and the mixture can be continuously inputted or directed into the reactor. Then, the butadiene-based rubber polymer (a1) and grafting monomers, (meth)acrylic acid alkyl ester monomer (a2), styrene-based monomer (a3) and acrylonitrile-based monomer (a4), can be reacted at about 55 to about 65° C. for about 2 to about 5 hours under conditions to conduct a primary graft polymerization step.

The (meth)acrylic acid alkyl ester monomer (a2), the styrene-based monomer (a3) and the acrylonitrile-based monomer (a4) can be directed or inputted into the reactor using the same monomer ratios throughout the reaction period of about 2 to about 5 hours. At the same time a polymerization initiator can be continuously directed or inputted into the reactor also throughout the reaction period of about 2 to about 5 hours.

By adding a polymerization initiator, a small amount of the grafting monomer and polymerization initiator can participate in the graft reaction at a constant speed. Then, a secondary graft copolymer latex may be prepared. At this point, the secondary graft copolymerization temperature can be about 65 to about 75° C.

At the end of the continuous input of the grafting monomer, the reactor temperature can be maintained at about 65 to about 75° C. for about 20 to about 120 minutes. After that, the polymerization can be terminated by forcibly freezing when the final polymerization conversion ratio reaches about 90 to about 98% to prepare the rubber-modified graft copolymer (A).

(B) Styrene-Based Copolymer

A styrene-based copolymer (B) may be prepared by copolymerizing a methacrylic acid alkyl ester monomer (b1), an acrylic acid alkyl ester monomer (b2), a styrene-based monomer (b3) and an acrylonitrile-based monomer (b4). The glass transition temperature of the styrene-based copolymer can be about 90° C. to about 100° C. by using methacrylic acid alkyl ester monomer (b1) having a low glass transition temperature in the styrene-based copolymer. This can reduce whitening of resin composition at low temperatures, which can otherwise occur due to generation of pores between interfaces at low temperatures.

The amounts of and the mixture ratio of the monomers which are used for preparing the styrene-based copolymer (B) are important to prepare a transparent resin composition. Depending on the same, refractive index can be changed. That is, for transparency, the refractive index of the rubber-modified graft copolymer (A) should be similar to the refractive index of the styrene-based copolymer (B). In exemplary embodiments, the difference between the refractive indexes may be 0.005 or less.

The styrene-based copolymer (B) may be prepared by copolymerizing about 40 to about 80% by weight of the methacrylic acid alkyl ester monomer (b1), about 5 to about 50% by weight of the acrylic acid alkyl ester monomer (b2), about 1 to about 30% by weight of the styrene-based monomer (b3), and about 1 to about 20% by weight of the acrylonitrile-based monomer (b4).

In some embodiments, the methacrylic acid alkyl ester monomer (b1) may be used in an amount of about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80% by weight. Further, according to some embodiments of the present invention, the methacrylic acid alkyl ester monomer (b1) may be used in an amount of from about any of the foregoing amounts to about any other of the foregoing amounts.

In some embodiments, the acrylic acid alkyl ester monomer (b2) may be used in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50% by weight. Further, according to some embodiments of the present invention, the acrylic acid alkyl ester monomer (b2) may be used in an amount of from about any of the foregoing amounts to about any other of the foregoing amounts.

In some embodiments, the styrene-based monomer (b3) may be used in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30% by weight. Further, according to some embodiments of the present invention, the styrene-based monomer (b3) may be used in an amount of from about any of the foregoing amounts to about any other of the foregoing amounts.

In some embodiments, the acrylonitrile-based monomer (b4) may be used in an amount of about 1, 2, 3, 4, 5, 6, 7, 8, 9, 10, 11, 12, 13, 14, 15, 16, 17, 18, 19, or 20% by weight. Further, according to some embodiments of the present invention, the acrylonitrile-based monomer (b4) may be used in an amount of from about any of the foregoing amounts to about any other of the foregoing amounts.

When the amount of the methacrylic acid alkyl ester monomer (b1) is less than about 40% by weight, the glass transition temperature of the styrene-based copolymer can be more than about 100° C., so whitening resistance at low temperatures may not be improved. Also when the amount of the acrylic acid alkyl ester monomer (b2) is not within the above range, transparency of the resin composition can be deteriorated because of the difference between the refractive index of the rubber-modified graft copolymer (A) and the refractive index of the styrene-based copolymer (B).

In addition, when the amount of the styrene-based monomer (b3) is within the above range, the resin composition can have excellent transparency. Also, when the amount of the acrylonitrile-based monomer (a4) is within the above range, the resin composition can have excellent impact strength, and yellowing of an article made using the resin composition can be minimized or prevented.

The methacrylic acid alkyl ester monomer (b1), the acrylic acid alkyl ester monomer (b2), the styrene-based monomer (b3) and the acrylonitrile-based monomer (b4) which are used for preparing the rubber-modified graft copolymer (A) may be used in the styrene-based copolymer (B).

When manufacturing the styrene-based copolymer (B), in order to control the molecular weight, a molecular weight control agent may be used. Examples of the molecular weight control agent can include without limitation mercaptans such as n-dodecylmercaptan, t-dodecylmercaptan, and the like, and combinations thereof.

In exemplary embodiments, the styrene-based copolymer (B) may have weight average molecular weight of about 100,000 to about 130,000 g/mol. Within this range, the resin composition comprising the styrene-based copolymer may have excellent impact strength, and it also may have excellent fluidity so processibility can be improved.

The styrene-based copolymer (B) may be included in an amount of about 25 to about 95% by weight based on 100% by weight of the rubber-modified graft copolymer (A) and the styrene-based copolymer (B). In some embodiments, the styrene-based copolymer (B) may be included in an amount of about 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95% by weight. Further, according to some embodiments of the present invention, the styrene-based copolymer (B) may be present in an amount of from about any of the foregoing amounts to about any other of the foregoing amounts.

Although manufacturing methods are not particularly limited, suspension polymerization, emulsion polymerization, and/or mass polymerization can be used to make the styrene-based copolymer (B). When the styrene-based copolymer (B) is manufactured using continuous mass polymerization, hardness of the resin composition can be improved. When the styrene-based copolymer (B) is manufactured using emulsion polymerization or suspension polymerization, emulsifiers or dispersants can be used because the polymerization is performed in water. After dehydration, emulsifiers or dispersant can remain in the copolymer, which can deteriorate hardness of the resin composition.

The transparent thermoplastic resin composition of the present invention may further comprise a methyl methacrylate-styrene-acrylonitrile (MSAN) copolymer. The MSAN copolymer may be prepared by polymerization of methyl methacrylate monomer, styrene monomer and acrylonitrile monomer. The methyl methacrylate-styrene-acrylonitrile (MSAN) copolymer may have a glass transition temperature of about 90° C. to 105° C.

(C) Silicone Oil

The transparent thermoplastic resin composition of the present invention may comprise a silicone oil (C) to improve impact strength.

Siloxane oil, for example dimethyl polysiloxane, may be used as the silicone oil (C). The viscosity of the silicone oil may be about 80 to about 110 cp.

The transparent thermoplastic resin composition may include the silicone oil (C) in an amount of about 0.01 to about 0.1 parts by weight based on about 100 parts by weight of the rubber-modified graft copolymer (A) and the styrene-based copolymer (B). In some embodiments, the transparent thermoplastic resin composition may include the silicone oil (C) in an amount of about 0.01, 0.02, 0.03, 0.04, 0.05, 0.06, 0.07, 0.08, 0.09, or 0.1 parts by weight. Further, according to some embodiments of the present invention, the silicone oil (C) may be present in an amount of from about any of the foregoing amounts to about any other of the foregoing amounts.

(D) Additives

The transparent thermoplastic resin composition of the present invention may further comprise one or more additives. Examples of the additives may include without limitation polymerization initiators, catalysts for initiation, emulsifying agents, molecular weight control agents, heat stabilizers, release agents, dispersants, anti-dripping agents, UV stabilizers, inorganic fillers, inorganic fibers and the like, and combinations thereof.

Fat soluble thermal decomposition polymerization initiators and/or water soluble thermal decomposition polymerization initiators may be used as the polymerization initiator.

Examples of the fat soluble thermal decomposition polymerization initiator can include without limitation acetylchlorohexyl sulfonylperoxide, 2-2'azobis-2,4-dimethylvaleronitrile, 2-2'azobis-(2-amidinopropane)dihydrochloride, lauroylperoxide, 2-2'-azobisisobutyronitrile, benzoylperoxide, cumene hydroperoxide, dicumyl peroxide, dimethyl-2,2'-azobisisobutyronitrile, 4,4'-azobis-4-cyanovaleric acid and the like, and combinations thereof.

The fat soluble thermal decomposition polymerization initiator may be included in an amount of about 0.05 to about 0.20 parts by weight based on about 100 parts by weight of the rubber-modified graft copolymer (A).

Examples of the water soluble thermal decomposition polymerization initiator can include without limitation potassium persulfate, sodium persulfate, ammonium persulfate, silver persulfate and the like, and combinations thereof.

The water soluble thermal decomposition polymerization initiator may be included in an amount of about 0.30 to about 0.80 parts by weight based on about 100 parts by weight of the rubber-modified graft copolymer (A).

Combinations of oxidants, reducing agents, activators and/or complexing agents may be used as the catalysts for initiation.

Benzoyl peroxide, cumene hydroperoxide or other hydroperoxides can be used as oxidants, ferric or ferrous salts, such as ferrous sulfate, can be used as reducing agents, various sugars including glucose, dextrose, fructose and sorbose can be used as activators, and sodium pyrophosphate or disodium ethylenediaminetetraacetate (disodium EDTA) can be used as complexing agents.

In exemplary embodiments, a combination of about 0.2 to about 0.5 parts by weight of cumene hydroperoxide, about 0.0005 to about 0.006 parts by weight of ferrous sulfate, about 0.01 to about 0.15 parts by weight of sodium pyrophosphate, and about 0.05 to about 0.15 parts by weight of dextrose each based on about 100 parts by weight of the rubber-modified graft copolymer (A) may be used as catalysts which is used in graft polymerization.

It may be difficult to prepare the desired graft copolymer without using the kinds of polymerization initiators and catalysts for initiation described herein. Also, if the amounts of the polymerization initiator and catalysts for initiation are lower than the above ranges, sufficient grafting percent cannot be ensured, the amount of unreacted monomer can increase, and also non-grafted polymer can be formed in excess. On the other hand, if the amount of polymerization initiator is greater than the above range, the polymerization system can be unstable due to the increase of the reaction rate, and formation of coagulation can be increased.

Conventional emulsifying agents used in emulsion polymerization can be used without limitation. Examples of the emulsifying agent can include without limitation potassium rosin acid, sodium laurylate, sodium oleate, potassium oleate, potassium stearate, sodium laurylsulfate and the like and combinations thereof.

The emulsifying agent may be included in an amount of about 0.3 to about 1.5 parts by weight based on about 100 parts by weight of the rubber-modified graft copolymer (A). If the amount of the emulsifying agent is less than about 0.3 parts by weight, the polymerization may be unstable due to a large formation of coagulation. If the amount of the emulsifying agent is more than about 1.5 parts by weight, it can be difficult to control physical properties, such as grafting percent and the like, and, when injection molding the resin composition, gas can be generated, which can deteriorate appearance.

Examples of the molecular weight control agent can include without limitation mercaptans, terpinolene, α-methyl styrene oligomer, and the like, and combinations thereof. In exemplary embodiments, mercaptans can be used.

The molecular weight control agent may be included in an amount of about 0.1 to about 1.0 parts by weight based on about 100 parts by weight of the rubber-modified graft copolymer (A). When the molecular weight control agent is used in an amount less than about 0.1 parts by weight, appearance and impact strength of the resin composition can be deteriorated due to deterioration of grafting percent, and also fluidity of the resin composition can be reduced. When the molecular weight control agent is used in an amount greater than about 1.0 parts by weight, productivity can be deteriorated because of slow polymerization speeds, physical properties of the resin composition, such as impact strength, can be deteriorated due to excessive grafting percent, and also there can be a problem with generation of gas due to oligomer.

The transparent thermoplastic resin composition that can have improved whitening resistance at low temperatures in accordance with the present invention may be prepared using any suitable conventional method to prepare a resin composition. For example, the composition components described herein and optional additives can be blended, and the blend can be melt extruded using conventional melt extrusion equipment to provide the transparent thermoplastic resin composition in the form of pellets or chips.

The present invention provides an article prepared from the transparent thermoplastic resin composition that can have excellent whitening resistance at low temperatures. Methods for preparing the article are not limited, and extrusion molding, injection molding, blow molding, compression molding, vacuum molding and/or casting may be applied. The molding can be performed by one skilled in the art.

The article of the present invention can have an Izod impact strength (un-notched) of about 8 to about 20 kgf·cm/cm which is measured for a ⅛ inch thickness in accordance with ASTM D256.

The article of the present invention can have a haze value of about 1.5 to about 4.0% which is measured for a thickness of 3.2 mm in accordance with ASTM D1003.

When examining the article specimen (10 cm×10 cm×0.3 cm) of the present invention with the naked eye at room temperature after leaving it in a chamber at −30° C. for 2 hours, whitening may not occur at all.

The present invention will be further illustrated by the following examples, which are intended for the purpose of illustration only and are not to be construed as in any way limiting the scope of the present invention.

EXAMPLES

Preparation Examples 1 to 3

Preparation of the Rubber-Modified Graft Copolymer (A)

The rubber-modified graft copolymer (A) is prepared as follows using the amounts of the reactants set forth in the following Table 1. First, the polybutadiene rubber (a1) is prepared by emulsion polymerization, and then the polybutadiene rubber (a1) and a water soluble polymerization initiator/catalyst mixture is directed into a reactor. Next methyl methacrylate monomer (a2), styrene monomer (a3), acrylonitrile monomer (a4) and a molecular weight control agent are mixed or blended and the mixture is stirred for 5 to 10 minutes. The mixture is then continuously directed into the reactor at about 55 to about 65° C. for about 2 to about 5 hours under conditions to conduct a primary graft polymerization step.

The methyl methacrylate monomer (a2), the styrene monomer (a3) and the acrylonitrile monomer (a4) is directed or inputted into the reactor using the same monomer ratios throughout the reaction period of about 2 to about 5 hours. At the same time a polymerization initiator is continuously directed or inputted into the reactor also throughout the reaction period of about 2 to about 5 hours. At this point, a secondary graft copolymerization can be conducted at a temperature of about 65 to about 75° C. Then, after terminating input of the graft monomers, the reactor temperature is maintained at about 65 to about 75° C. for about 20 to about 120 minutes. After this, polymerization is terminated by forcibly freezing when the final conversion ratio reaches about 93 to about 98%. In this manner the rubber-modified graft copolymer (A) may be prepared.

In Table 1, the mixing ratio of (a1), (a2), (a3) and (a4) is represented by % by weight based on 100% by weight of (a1), (a2), (a3) and (a4), and the mixing ratio of (D) is represented by parts by weight based on 100 parts by weight of (a1), (a2), (a3) and (a4).

TABLE 1

|  |  | Preparation Example 1 (A1) | Preparation Example 2 (A2) | Preparation Example 3 (A3) |
|---|---|---|---|---|
| (a1) Polybutadiene rubber | Amount | 50 | 50 | 50 |
|  | Average diameter (Å) | 1,500 | 2,500 | 3,000 |
| (a2) Methyl methacrylate monomer |  | 35 | 35 | 35 |
| (a3) Styrene monomer |  | 10 | 10 | 10 |
| (a4) Acrylonitrile monomer |  | 5 | 5 | 5 |
| (D) Additives | Polymerization initiator | 0.8 | 0.6 | 0.5 |
|  | Emulsifying agent | 1.0 | 0.5 | 0.4 |

Preparation Examples 4 to 7

Preparation of the Styrene-Based Copolymer (B1)

The styrene-based copolymer (B1) is prepared by a conventional suspension polymerization in a reactor using the amounts of monomers set forth in the following Table 2.

In Table 2, the mixing ratio of (b1), (b2), (b3) and (b4) is represented by % by weight based on 100% by weight of the (b1), (b2), (b3) and (b4).

TABLE 2

|  | Preparation Example 4 (B11) | Preparation Example 5 (B12) | Preparation Example 6 (B13) | Preparation Example 7 (B14) |
|---|---|---|---|---|
| (b1) Methyl methacrylate monomer | 69 | 65 | 61 | 74 |
| (b2) Methyl acrylate monomer | 5 | 9 | 13 | — |
| (b3) Styrene monomer | 22.5 | 22.5 | 22.5 | 22.5 |
| (b4) Acrylonitrile monomer | 3.5 | 3.5 | 3.5 | 3.5 |
| Glass transition temperature (° C.) | 99.3 | 95.2 | 92.2 | 106.1 |
| Weight average molecular weight (g/mol) | 120,000 | 120,000 | 120,000 | 135,000 |

Preparation Example 8

Preparation of the Styrene-Based Copolymer (B2)

The styrene-based copolymer (B2) having a glass transition temperature of 95° C. is prepared by mass polymerization of 74% by weight of the methyl methacrylate monomer, 22.5% by weight of the styrene monomer and 3.5% by weight of the acrylonitrile monomer.

The pellet-formed transparent thermoplastic resin composition is prepared by extruding/processing the rubber-modified graft copolymer (A), the styrene-based copolymer (B1), another styrene-based copolymer (B2), silicone oil (C) and other additives (D) according to the amount ratios set forth in the following Table 3. The composition is extruded using a twin screw extruder having L/D=29 and an average diameter of 45 mm, and setting a barrel temperature at 230° C. After drying the prepared pellets at 80° C. for 2 hours, a specimen is formed using a 6 oz injection molding machine at a cylinder temperature of 240° C. and a mold temperature of 60° C.

In the following Table 3, the mixing ratio of (A), (B1) and (B2) is represented by % by weight based on 100% by weight of the (A), (B1) and (B2), and the mixing ratio of (C) and (D) is represented by parts by weight based on 100 parts by weight of the (A), (B1) and (B2).

TABLE 3

| | | Examples | | | | | | | | | Comparative Examples | | |
|---|---|---|---|---|---|---|---|---|---|---|---|---|---|
| | | 1 | 2 | 3 | 4 | 5 | 6 | 7 | 8 | 9 | 1 | 2 | 3 |
| (A) | (A1) | 25 | 25 | 25 | — | — | — | — | — | — | 25 | — | — |
| | (A2) | — | — | — | 25 | 25 | 25 | — | — | — | — | 25 | — |
| | (A3) | — | — | — | — | — | — | 25 | 25 | 25 | — | — | 25 |
| (B1) | (B11) | 75 | 50 | 25 | — | — | — | — | — | — | — | — | — |
| | (B12) | — | — | — | 75 | 50 | 25 | — | — | — | — | — | — |
| | (B13) | — | — | — | — | — | — | 75 | 50 | 25 | — | — | — |
| | (B14) | — | — | — | — | — | — | — | — | — | 75 | 75 | 75 |
| (B2) | | — | 25 | 50 | — | 25 | 50 | — | 25 | 50 | — | — | — |
| (C) | | 0.02 | 0.01 | 0.01 | 0.02 | 0.01 | 0.01 | 0.02 | 0.01 | 0.01 | 0.01 | 0.01 | 0.01 |
| (D) | | 5 | 5 | 5 | 5 | 5 | 5 | 5 | 5 | 5 | 5 | 5 | 5 |

Physical properties are evaluated for the prepared specimen by the following methods, and the results are set forth in Table 4.

TABLE 4

| | Examples | | | | | | | | | Comparative Examples | | |
|---|---|---|---|---|---|---|---|---|---|---|---|---|
| | 1 | 2 | 3 | 4 | 5 | 6 | 7 | 8 | 9 | 1 | 2 | 3 |
| Impact strength | 8.0 | 14.2 | 18.5 | 7.8 | 14.5 | 18.9 | 7.5 | 14.2 | 19.8 | 7.2 | 13.5 | 16.5 |
| Transparency | 1.9 | 2.5 | 3.3 | 1.9 | 2.5 | 3.3 | 1.8 | 2.6 | 3.5 | 1.9 | 2.5 | 3.3 |
| Whitening at low temperature | X | X | X | X | X | X | X | X | X | ○ | ◉ | ◉ |

(1) Impact strength (kgf · cm/cm): Izod impact strength (un-notched) is measured for 1/8 inch thickness in accordance with ASTM D256.
(2) Transparency (%): Haze value is measured for thickness of 3.2 mm in accordance with ASTM D1003.
(3) Whitening at low temperature: After leaving the specimen (10 cm × 10 cm × 0.3 cm) in a chamber at −30° C. for 2 hours, whitening at low temperature is examined with the naked eye at room temperature and rated according to the following scale:
◉: whitening seriously occurs,
○: whitening occurs,
X: whitening does not occur.

As shown in Table 4, in the case of Examples 1 to 9 which are prepared by copolymerizing the styrene-based copolymer (B1) with methyl acrylate monomer (b2), whitening at a low temperature is not shown regardless of the average particle diameter of the rubber-modified graft copolymer (A), and Examples 1 to 9 have excellent impact strength and transparency. On the other hand, in the case of Comparative Examples 1 to 3 which are prepared by not copolymerizing the styrene copolymer (B1) with methyl acrylate monomer (b2), whitening at low temperature is shown.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed herein and that modifications and other embodiments are intended to be included within the scope of the appended claims. Although specific terms are employed herein, they are used in generic and descriptive sense only and not for purposes on limitation of the scope of the invention being defined in the claims.

What is claimed are:

1. A transparent thermoplastic resin composition that can have improved whitening resistance at low temperatures comprising:
   (A) a rubber-modified graft copolymer which is prepared by copolymerizing (a2) a (meth)acrylic acid alkyl ester monomer, (a3) a styrene-based monomer and (a4) an acrylonitrile-based monomer onto (a1) a butadiene-based rubber polymer;
   (B) a styrene-based copolymer having glass transition temperature of about 90 to about 100° C. which is prepared by copolymerizing (b1) a methacrylic acid alkyl ester monomer, (b2) an acrylic acid alkyl ester monomer, (b3) a styrene-based monomer and (b4) an acrylonitrile-based monomer; and
   (C) a silicone oil.

2. The transparent thermoplastic resin composition of claim 1, wherein the difference between the refractive index of the rubber-modified graft copolymer (A) and the refractive index of the butadiene-based rubber polymer (a1) is about 0.005 or less, and the difference between the refractive index of the rubber-modified graft copolymer (A) and the refractive index of the styrene-based copolymer (B) is about 0.005 or less.

3. The transparent thermoplastic resin composition of claim 1, wherein the transparent thermoplastic resin composition comprises about 5 to about 75% by weight of the rubber-modified graft copolymer (A); about 25 to about 95% by weight of the styrene-based copolymer (B); and about 0.01 to about 0.1 parts by weight of the silicone oil (C) based on about 100 parts by weight of the rubber-modified graft copolymer (A) and the styrene-based copolymer (B).

4. The transparent thermoplastic resin composition of claim 1, wherein the rubber-modified graft copolymer (A) is prepared by copolymerizing the (meth)acrylic acid alkyl ester monomer (a2), the styrene-based monomer (a3) and the acrylonitrile-based monomer (a4) at about 55 to about 80 grafting percent onto the butadiene-based rubber polymer (a1).

5. The transparent thermoplastic resin composition of claim 1, wherein the rubber-modified graft copolymer (A) comprises about 20 to about 60% by weight of the butadiene-based rubber polymer (a1), about 20 to about 60% by weight of the (meth)acrylic acid alkyl ester monomer (a2), about 10 to about 40% by weight of the styrene-based monomer (a3) and about 1 to about 20% by weight of the acrylonitrile-based monomer (a4).

6. The transparent thermoplastic resin composition of claim 1, wherein the styrene-based copolymer (B) comprises about 40 to about 80% by weight of the methacrylic acid alkyl ester monomer (b1), about 5 to about 50% by weight of the acrylic acid alkyl ester monomer (b2), about 1 to about 30% by weight of the styrene-based monomer (b3) and about 1 to about 20% by weight of the acrylonitrile-based monomer (b4).

7. The transparent thermoplastic resin composition of claim 1, wherein the transparent thermoplastic resin composition further comprises methyl methacrylate-styrene-acrylonitrile (MSAN) copolymer.

8. The transparent thermoplastic resin composition of claim 1, wherein the butadiene-based rubber polymer (a1) comprises polybutadiene polymer, styrene-butadiene copolymer or a combination thereof.

9. The transparent thermoplastic resin composition of claim 1, wherein the butadiene-based rubber polymer (a1) has an average particle diameter of about 0.05 to about 0.4 μm, about 60 to about 95% by weight of gel content, and a swelling index of about 10 to about 30.

10. The transparent thermoplastic resin composition of claim 1, wherein the (meth)acrylic acid alkyl ester monomer (a1) has 2 to 20 carbon atoms, the methacrylic acid alkyl ester monomer (b1) has 2 to 20 carbon atoms, and the acrylic acid alkyl ester monomer (b2) has 2 to 20 carbon atoms.

11. The transparent thermoplastic resin composition of claim 1, wherein the styrene-based monomer comprises styrene, α-ethyl styrene, α-methyl styrene, p-methyl styrene, o-t-butyl styrene, bromo styrene, chloro styrene, trichloro styrene or a combination thereof.

12. The transparent thermoplastic resin composition of claim 1, wherein the acrylonitrile-based monomer comprises acrylonitrile, methacrylonitrile, fumaronitrile or a combination thereof.

13. The transparent thermoplastic resin composition of claim 1, wherein the styrene-based copolymer (B) has a weight average molecular weight of about 100,000 to about 130,000 g/mol.

14. The transparent thermoplastic resin composition claim 1, further comprising one or more additives selected from the group consisting of polymerization initiators, catalysts for initiation, emulsifying agents, molecular weight control agents, heat stabilizers, release agents, dispersants, anti-dripping agents, UV stabilizers, inorganic fillers, inorganic fibers, and combinations thereof.

15. A molded article prepared from the transparent thermoplastic resin composition of claim 1.

16. The molded article of claim 15, wherein the molded article has an Izod impact strength (un-notched) of about 8 to about 20 kgf·cm/cm measured for a ⅛ inch thickness in accordance with ASTM D256.

17. The molded article of claim 15, wherein the molded article has a haze value of about 1.5 to about 4.0% measured for a 3.2 mm thickness in accordance with ASTM D1003.

* * * * *